(12) United States Patent
Bhagat et al.

(10) Patent No.: US 8,874,642 B2
(45) Date of Patent: Oct. 28, 2014

(54) SYSTEM AND METHOD FOR MANAGING THE PERFORMANCE OF AN ENTERPRISE APPLICATION

(75) Inventors: Sandeep Bhagat, Bangalore (IN); Venkata Reddy Donthireddy, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/424,979

(22) Filed: Mar. 20, 2012

(65) Prior Publication Data

US 2012/0259976 A1    Oct. 11, 2012

(30) Foreign Application Priority Data

Apr. 7, 2011    (IN) .......................... 1191/CHE/2011

(51) Int. Cl.
*G06F 15/16* (2006.01)
*G06F 9/46* (2006.01)
*G06F 9/50* (2006.01)

(52) U.S. Cl.
CPC ...... *G06F 9/5083* (2013.01); *G06F 2209/5019* (2013.01)
USPC ........................................... 709/203; 718/100

(58) Field of Classification Search
USPC ........................................... 718/100; 709/203
See application file for complete search history.

(56) References Cited

U.S. PATENT DOCUMENTS

| | | | |
|---|---|---|---|
| 7,499,995 B2 | 3/2009 | Armstrong | |
| 7,774,408 B2 | 8/2010 | Sinha | |
| 2003/0177160 A1* | 9/2003 | Chiu et al. | ..................... 709/100 |
| 2008/0025243 A1 | 1/2008 | Corneille | |
| 2010/0081417 A1 | 4/2010 | Hickie | |
| 2010/0257199 A1* | 10/2010 | Gopalraj et al. | ............... 707/770 |

* cited by examiner

*Primary Examiner* — Emmanuel L Moise
*Assistant Examiner* — Mahran Abu Roumi
(74) *Attorney, Agent, or Firm* — Stephen M. Hertzler; Marc S. Kaufman; Reed Smith LLP

(57) ABSTRACT

The present disclosure relates to a framework to improve the predictability of performance problems in an enterprise application. In one embodiment, the present disclosure produces accurate predictive analysis by taking into consideration all the factors including workload, historical performance, environments, configurations, and data volumes etc. which are significant for determining the future performance characteristics of the system. In addition, the present disclosure calculates the actual impact of the determined performance characteristics on the business.

18 Claims, 3 Drawing Sheets

SYSTEM AND METHOD FOR MANAGING THE PERFORMANCE OF AN ENTERPRISE APPLICATION

RELATED APPLICATION DATA

This application claims priority to Indian Patent Application No. 1191/CHE/2011, filed Apr. 7, 2011, which is hereby incorporated by reference in its entirety.

TECHNICAL FIELD

Embodiments of the present disclosure relates to the field of enterprise application performance monitoring and management. In particular, embodiments of the disclosure relate to a system and a method for managing the performance of an enterprise application.

BACKGROUND

Enterprise application performance management is a set of processes that enable the management of performance of an organization to achieve one or more pre-selected goals.

An exemplary embodiment of currently available performance monitoring and management systems is illustrated in FIG. 1. Most of the current management systems collect various performance metrics from a server 100 in the system. Using the collected performance metrics, the system will generate time scaled system metrics 102. In addition, various thresholds 104 will be defined by the Information Technology (IT) team 106. The system will then co-relate the time-scaled system metrics 102 with the thresholds 104. Based on the co-relation, a breach identifier 108 will identify a breach. Once a breach is identified, a reporting unit 110 generates an appropriate alarm and reports the breach.

In addition to these processes, some of the existing performance monitoring and management systems comprise an issue diagnostic unit 112 that has diagnostic capabilities to identify hotspot areas by co-relating and analyzing metrics. Further, some systems comprise predictive analysis unit 114 which has forecasting capabilities to predict performance based on the historic performance of the system. Also, some systems include system execution model 116 that have capabilities to define and monitor performance of business transactions and drill down to view individual systems performance metrics in the distributed transaction path.

The above described performance management systems identify performance issues on occurrence, but they cannot accurately pin point the components affecting business transaction performance due to the following reasons.

Firstly, none of the currently available performance management systems accurately track transaction passing through multiple layers/applications/servers in an enterprise or in dynamic environments, for example: cloud, as the metrics in each layer is supported by a different format.

Secondly, the current systems do not co-relate workload elements while identifying threshold breaches and while diagnosing performance issues. Further, while predicting future workload, the current systems do not consider the trends observed in the current workload, for example: increase in number of users, month-on-month growth in number of requests. Further, none of the currently available systems co-relate performance improvement/degradation with corresponding impact on business.

External factors like change in workload, change in data volume, existing/target infrastructure etc must be considered while forecasting performance as these factors can change the performance characteristics. However, none of the present systems take into account all these external factors while calculating the performance.

Therefore, there exists a need to develop a system and a method for managing performance of an enterprise application to overcome the above-mentioned problems.

SUMMARY OF THE DISCLOSURE

Accordingly, the present disclosure relates to a system for managing the performance of an enterprise application. The system comprises a central server which is configured to collect workload and performance metrics from a plurality of servers in a performance message protocol. Using the workload metrics collected over a predefined period of time, a workload modeler creates a current workload model. Using the current workload model created over a predefined period of time, a trend analyzer produces a forecast workload model. The system further comprises an enterprise infrastructure modeler which tracks and maintains configuration changes in the plurality of servers. In addition, the system comprises a predictive analyzer which receives a plurality of inputs to predict a future workload for managing the enterprise application performance. In one embodiment, the plurality of inputs comprises the current workload model, the forecast workload model, current infrastructure deployment model, the configuration changes in plurality of servers and external factors including data volume growth and application configuration changes. Finally, a business analytics unit of the system analyzes effect of the future workload on business performance.

In one embodiment, the present disclosure relates to a method for managing the performance of an enterprise application. The method involves collecting workload metrics in performance message protocol from plurality of servers and creating a current workload model using the workload metrics collected over a predefined period of time. Using the workload model created over a predefined period of time, the method produces a forecast workload model. Further, the method involves tracking and maintaining configuration changes in plurality of servers. Subsequently, a plurality of inputs are received to predict a future workload for managing the enterprise application performance, wherein the plurality of inputs comprises the current workload model, the forecast workload model, current infrastructure model, the configuration changes in the plurality of servers and external factors including data volume growth and application configuration changes. Finally, the method involves analyzing effect of the future workload on business performance.

BRIEF DESCRIPTION OF THE DRAWINGS

The features of the present disclosure are set forth with particularity in the appended claims. The disclosure itself, together with further features and attended advantages, will become apparent from consideration of the following detailed description, taken in conjunction with the accompanying drawings. One or more embodiments of the present disclosure are now described, by way of example only, with reference to the accompanied drawings wherein like reference numerals represent like elements and in which:

Figure 1:
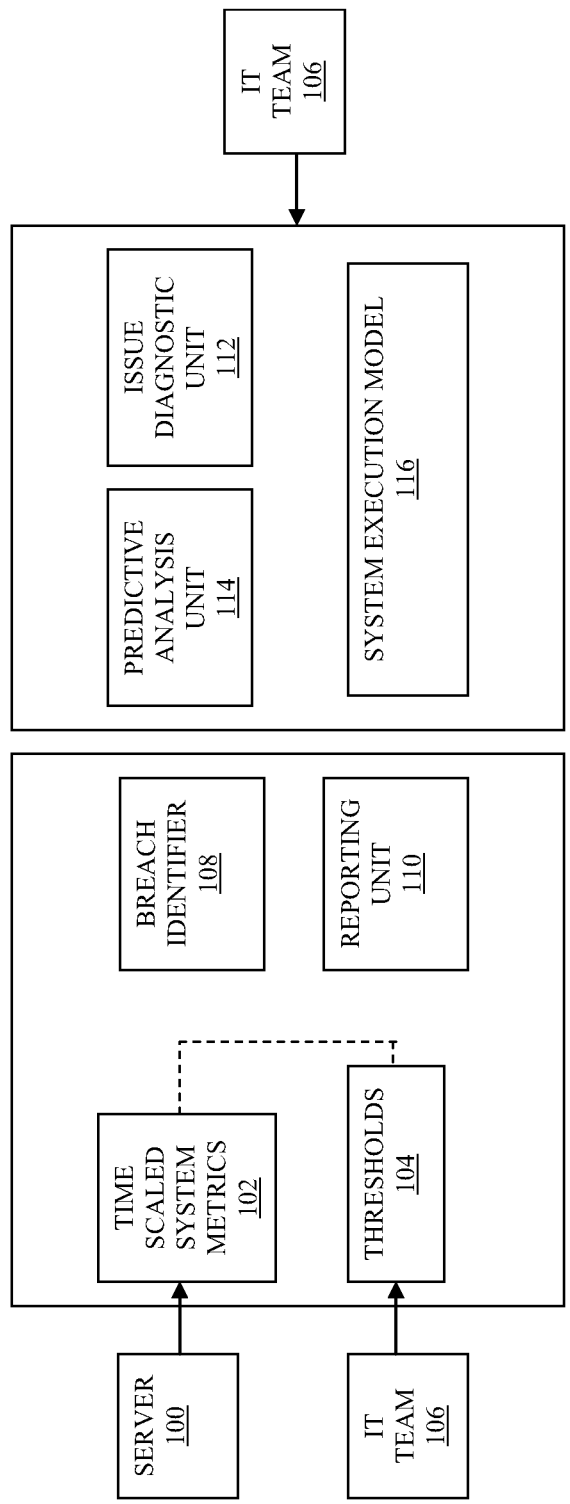
FIG. 1 illustrates a simplified diagram of conventional performance monitoring and management system.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

The present disclosure relates to the field of enterprise application performance monitoring and management. In particular, the present disclosure relates to a system and a method for managing the performance of an enterprise application.

In one embodiment, the present disclosure relates to a system for managing the performance of an enterprise application. The system comprises a central server which is configured to collect workload and performance metrics from a plurality of servers in a performance message protocol. Using the workload metrics collected over a predefined period of time, a workload modeler creates a current workload model. Using the current workload model created over a predefined period of time, a trend analyzer produces a forecast workload model. The system further comprises an enterprise infrastructure modeler which tracks and maintains configuration changes in the plurality of servers. In addition, the system comprises a predictive analyzer which receives a plurality of inputs to predict a future workload for managing the enterprise application performance. In one embodiment, the plurality of inputs comprises the current workload model, the forecast workload model, current infrastructure deployment model, the configuration changes in plurality of servers and external factors including data volume growth and application configuration changes. Finally, a business analytics unit of the system analyzes effect of the future workload on business performance.

In another embodiment of the present disclosure, the system further comprises a co-relation unit configured to compare the standardized metrics with a predetermined threshold value, a breach identifier configured to detect a breach and output a signal based on the comparison, and an issue diagnostic unit configured to identify reason for the breach.

In yet another embodiment of the present disclosure, the system is capable of associating a cost to each business transaction and determining cost variance based on the business performance; and predicting the degradation service levels and cost impact based on the business performance.

In still another embodiment of the present disclosure, the enterprise application comprises different platforms and application environments distributed across multiple environments.

In one embodiment, the present disclosure relates to a method for managing the performance of an enterprise application. The method involves collecting workload metrics in performance message protocol from plurality of servers and creating a current workload model using the workload metrics collected over a predefined period of time. Using the workload model created over a predefined period of time, the method produces a forecast workload model. Further, the method involves tracking and maintaining configuration changes in plurality of servers. Subsequently, a plurality of inputs are received to predict a future workload for managing the enterprise application performance, wherein the plurality of inputs comprises the current workload model, the forecast workload model, current infrastructure model, the configuration changes in the plurality of servers and external factors including data volume growth and application configuration changes. Finally, the method involves analyzing effect of the future workload on business performance.

In another embodiment of the present disclosure, the method further comprises comparing the standardized metrics with a predetermined threshold value; detecting a breach and outputting a signal based on the comparison; and identifying reason for the breach.

In yet another embodiment of the present disclosure, analyzing effect of the future workload on business performance comprises associating a cost to each business transaction and determining cost variance based on the business performance; and predicting the degradation service levels and cost impact based on the business performance.

Figure 2:
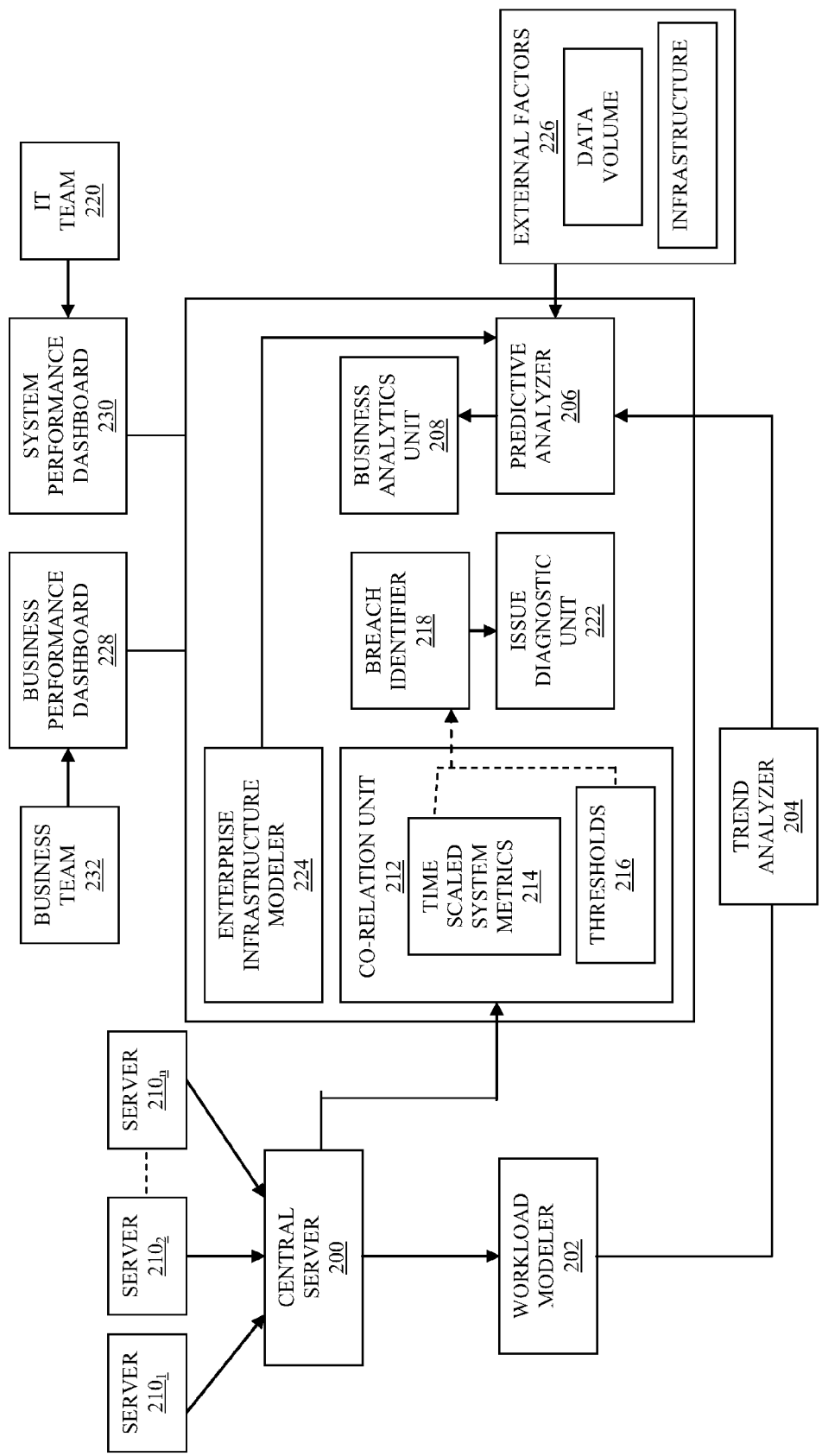
FIG. 2 illustrates a system for managing performance of an enterprise application in accordance with the present disclosure.

FIG. 2 illustrates a system for managing performance of an enterprise application according to an embodiment of the present disclosure.

The system for managing the performance of an enterprise application comprises different platforms and application environments and is distributed across multiple environments. In one embodiment, the system comprises of a central server 200, a workload modeler 202, a trend analyzer 204, a predictive analyzer 206 and a business analytics unit 208.

The central server 200 collects workload and performance metrics from a plurality of servers $210_1$, $210_2$, ..., $210_n$ (hereinafter collectively referred to as 210) present in the system for a predefined period of time. Each of the servers 210 represent the metrics in a different format which interrupts in accurate tracking of transactions. The central server 200 therefore defines the collected metrics in a performance message protocol which helps to track and diagnose business transactions across multiple application platforms. The performance message protocol allows capturing data required for both business and system characteristics in a single message.

The central server 200 is connected to a co-relation unit 212 which takes the performance message protocol metrics 214 as input and compares the metrics with a predefined threshold value 216. This comparison result is then used by a breach identifier 218 for identifying threshold breaches. Upon detection of a breach, the breach identifier 218 outputs a signal for reporting the breach to the IT team 220. The system further comprises an issue diagnostic unit 222 which identifies reason for the breach and provides an accurate performance diagnosis.

The central server 200 is further connected to the workload modeler which creates a current workload model using the performance message protocol metrics collected over the predefined period of time. Based on the current workload model created for a predefined period of time by the workload modeler 202, the trend analyzer 204 produces a forecast workload model. The forecast workload model is generated by analyzing the current and historic workload models and identifying the trend there from. This forecast workload model is then provided as input to the predictive analyzer 206. The system further comprises an enterprise infrastructure modeler 224 in the present system to keep track of the dynamically changing environments (including but not limited to public and private cloud) and also maintains configuration changes in the plurality of servers.

Along with receiving input from the trend analyzer 204, the predictive analyzer 206 receives a plurality of other inputs which are significant for determining the future performance characteristics of the system. The said inputs include the current workload model collected over a predefined period of time, current infrastructure deployment model and the configuration changes in the plurality of servers etc. In addition to these inputs, the predictive analyzer 206 takes input of all external factors 226 like data volume growth and application configuration changes which may affect the future performance. Based on these inputs, the predictive analyzer 206 accurately predicts a future workload which in turn determines the future performance of the enterprise application.

Further, the output from the predictive analyzer 206 is fed to the business analytics unit 208 connected therewith for associating the future performance characteristics with actual impact on business. The business analytics unit 208 co-relates the performance improvement/degradation with corresponding impact on business by associating a cost to each business transaction and determining cost variance based on the business performance. For example: performance degradation in the enterprise application would result in loss to enterprise and vice-versa. Similarly, impact of reduction in throughput on business revenue, impact of underutilized system resources on system operation and maintenance is predicted by associating a cost with each transaction and software/hardware component. This is done through a business performance dashboard 228 and system performance dashboard 230 connected with the business analytics unit 208. The business performance dashboard 228 and system performance dashboard 230 is monitored by the business team 232 and the IT team 220 respectively. The business analytics unit 208 also predicts the degradation service levels and cost impact on the enterprise due to performance degradation.

Figure 3:
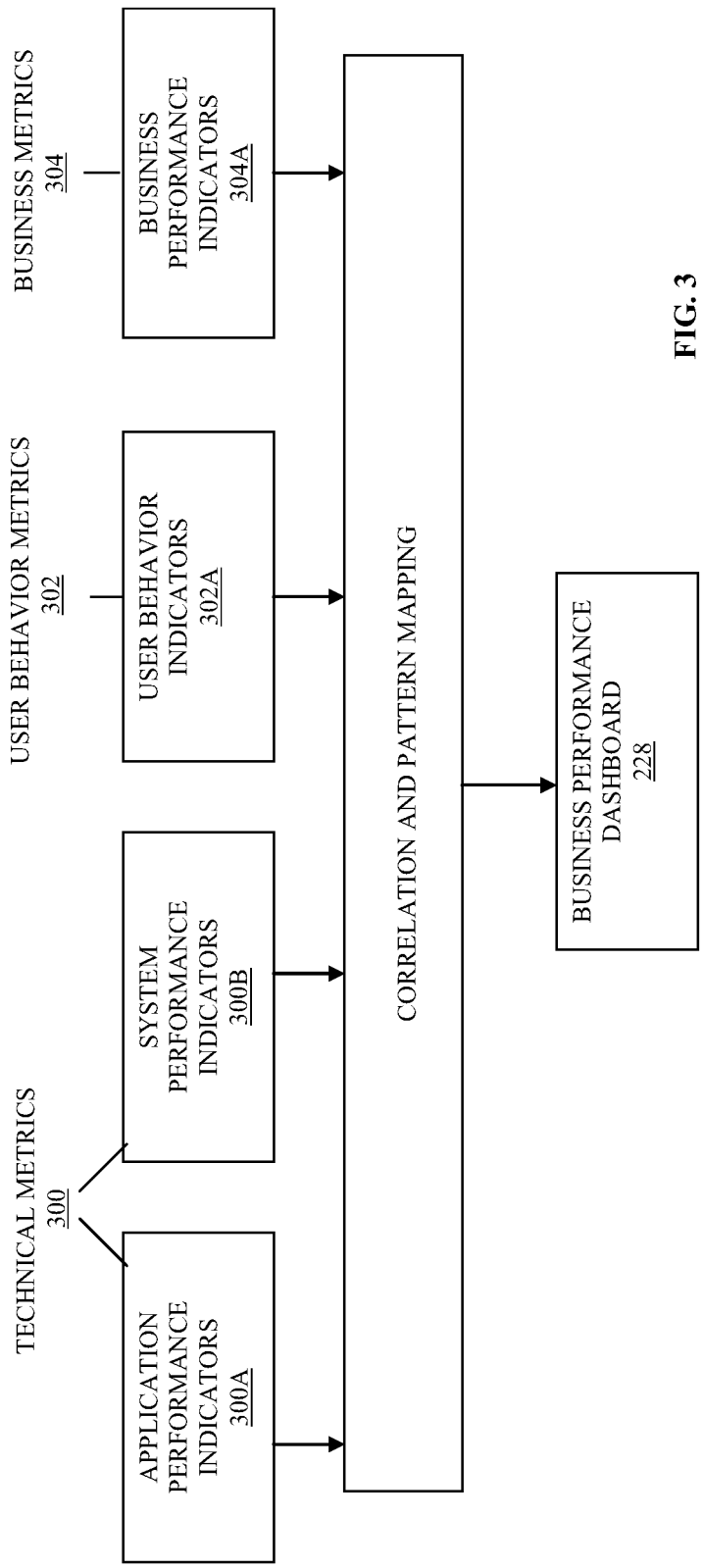
FIG. 3 illustrates a functional diagram of the business analytics component of the system in accordance with the present disclosure.

FIG. 3 illustrates a functional diagram of the business analytics component of the system in accordance with the present disclosure.

The business analytics unit 208 analyzes and reports the impact of system performance on business and thus addresses the need of the business teams to understand the effect of performance degradation/improvement on the business. In one embodiment, the business analytics unit 208 takes input of a plurality of metrics which include but not limiting to technical metrics 300, user behavior metrics 302 and business metrics 304. The technical metrics in turn comprises application performance indicators 300A like response time for each request, number of hits and number of sessions, and system performance indicators 300B like CPU utilization, memory utilization and network utilization. The user behavior metrics 302 include indicators 302A such as average user thinking time, average session length and abandonment of session by user etc. The business performance metrics 304 include indicators 304A such as throughput, i.e. number of orders created, amount generated/number of hits and user base etc.

On receiving these inputs, the business analytics unit 208 co-relates the technical, user and business metrics and identifies the revenue gained or lost due to application performance. The unit 208 further identifies the key application or system drivers influencing business metrics. All these information is passed to the business team 232 for analysis through the business performance dashboard 228.

The methodology disclosed in the present disclosure quantifies the impact of system performance on the business and shares this information with the business stakeholders to enable better risk mitigation. Further, the performance message protocol of the present disclosure helps in standardizing metrics collected across disparate platforms which provide an easy way to track and analyze business transaction. Also, the method and system as disclosed in the disclosure improves the predictability of application performance by taking into account all the factors that may affect the performance characteristics. The present disclosure provides for enhanced performance issue diagnostics and threshold breach detection.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system for managing the performance of an enterprise application, said system comprising:
    a central server configured to collect workload and performance metrics in a performance message protocol from a plurality of servers;
    a workload modeler configured to create a current workload model using the workload metrics collected over a predefined period of time;
    a trend analyzer configured to produce a forecast workload model, the forecast workload model being based at least in part on a trend associated with the current workload model created over a predefined period of time;
    an enterprise infrastructure modeler configured to track and maintain configuration changes in the plurality of servers;
    a predictive analyzer configured to receive a plurality of inputs to predict a future workload for managing the enterprise application performance, wherein the plurality of inputs comprises the current workload model, the forecast workload model, current infrastructure deployment model, the configuration changes in the plurality of servers and external factors including data volume growth and application configuration changes;

a business analytics unit configured to analyze effect of the future workload on business performance, the business analytics unit being configured to receive inputs from technical metrics, user behavior metrics and business metrics, the user behavior metrics including average user thinking time, or average session length, or abandonment of a session by a user; and a business performance dashboard configured to receive and display information from the business analytics unit.

2. The system as claimed in claim 1, further comprising:

a co-relation unit configured to compare the standardized metrics with a predetermined threshold value;

a breach identifier configured to detect a breach and output a signal based on the comparison; and an issue diagnostic unit configured to identify reason for the breach.

3. The system as claimed in claim 1, wherein the system is capable of:

associating a cost to each business transaction and determining cost variance based on the business performance; and predicting the degradation service levels and cost impact based on the business performance.

4. The system as claimed in claim 1, wherein the enterprise application comprises different platforms and application environments distributed across multiple environments.

5. The system as claimed in claim 1, wherein the technical metrics comprise application performance indicators and system performance indicators.

6. The system as claimed in claim 5, wherein the application performance indicators include response time for each request, or number of hits, or number of sessions.

7. The system as claimed in claim 5, wherein the business analytics unit co-relates the technical metrics, the user metrics and the business metrics, and wherein the business analytics unit identifies revenue gained or lost due to application performance.

8. The system as claimed in claim 6, wherein the system performance indicators include central processing unit utilization, or memory utilization, or network utilization.

9. The system as claimed in claim 8, wherein the business performance metrics include number of orders created, or number of hits, or user base.

10. A method for managing the performance of an enterprise application, said method comprising the steps of:

collecting workload metrics in performance message protocol from a plurality of servers;

creating a current workload model using the workload metrics collected over a predefined period of time;

producing a forecast workload model, the forecast workload model being based at least in part on a trend associated with the current workload model created over a predefined period of time;

tracking and maintaining configuration changes in the plurality of servers;

receiving a plurality of inputs to predict a future workload for managing the enterprise application performance, wherein the plurality of inputs comprises the current workload model, the forecast workload model, current infrastructure model, the configuration changes in the plurality of servers and external factors including data volume growth and application configuration changes;

analyzing effect of the future workload on business performance based at least in part on inputs received from technical metrics, user behavior metrics and business metrics, the technical metrics including response time of any request, or number of hits, or number of sessions; and presenting at least a portion of the analysis through a business performance dashboard.

11. The method as claimed in claim 10, further comprising:

comparing the standardized metrics with a predetermined threshold value;

detecting a breach and outputting a signal based on the comparison; and identifying reason for the breach.

12. The method as claimed in claim 10, wherein analyzing effect of the future workload on business performance comprises:

associating a cost to each business transaction and determining cost variance based on the business performance; and predicting the degradation service levels and cost impact based on the business performance.

13. The method as claimed in claim 10, wherein the enterprise application comprises different platforms and application environments distributed across multiple environments.

14. The method as claimed in claim 10, wherein the technical metrics comprise application performance indicators and system performance indicators.

15. The method as claimed in claim 14, further comprising:

co-relating the technical metrics, the user metrics and the business metrics; and identifying revenue gained or lost due to application performance.

16. The method as claimed in claim 14, wherein the system performance indicators include central processing unit utilization, or memory utilization, or network utilization.

17. The method as claimed in claim 16, wherein the user behavior metrics include average user thinking time, or average session length or abandonment of a session by a user.

18. The method as claimed in claim 17, wherein the business performance metrics include number of orders created, or number of hits, or user base.

* * * * *